G. W. SCHIMMEL.
FLOWER OR PLANT HOLDER.
APPLICATION FILED OCT. 3, 1919.
1,357,732. Patented Nov. 2, 1920.
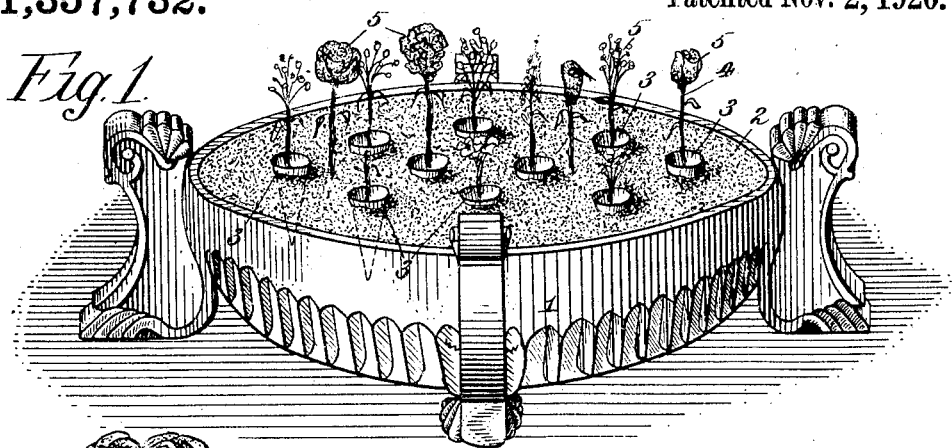
WITNESSES
Fred Fredrick
S.W. Foster
INVENTOR
G.W. Schimmel.
BY
ATTORNEYS

UNITED STATES PATENT OFFICE.

GERARD WILLEM SCHIMMEL, OF THE HAGUE, NETHERLANDS.

FLOWER OR PLANT HOLDER.

1,357,732.   Specification of Letters Patent.   Patented Nov. 2, 1920.

Application filed October 3, 1919. Serial No. 328,182.

*To all whom it may concern:*

Be it known that I, GERARD WILLEM SCHIMMEL, a subject of the Queen of the Netherlands, and a resident of The Hague, Netherlands, have invented a new and Improved Flower or Plant Holder.

This invention relates to improvements in flower or plant holders, an object of the invention being to provide a flower holder which can be forced into a bed of earth or other granular material and which will hold a flower or plant in upright position.

A further object is to provide a holder of the character described which permits the flowers or plants to be positioned in the bed without the necessity of first preparing holes in the bed to receive the same.

With these and other objects in view, the invention consists of certain novel features of construction and certain novel steps of the method which will be hereinafter more fully described, and pointed out in the claim.

In the accompanying drawings, Figure 1 is a perspective view illustrating my improved holders and ornamental bed.

Fig. 2 is a view partly in elevation and partly in section illustrating my improved holder.

1 represents an ornamental support in which a bed 2 of earth or other loose or soft material is located. 3 represents my improved holder, particular reference being had to Fig. 2. The holder is generally of conical form with a relatively sharp lower end 4 permitting the holder to be forced into the bed 2 without the necessity of first providing a hole in the bed to receive same. The holder 3 is provided at its opposite sides with inwardly projecting portions 7 forming a restricted neck or support 8 for the stem 4ª of the flowers 5. It is of course to be understood that plants may be used instead of flowers as desired.

Having thus described my invention, what I claim as new and desire to secure by Letters Patent is:

A holder of the character described, comprising a stem receptacle having a sharp end adapted to be forced into a retaining bed, said receptacle having its wall bent inwardly to form an internal stem-receiving restricted portion intermediate the ends of the receptacle, and said body of a conical shape of greatest diameter at its upper end and reducing in diameter to its lower end.

GERARD WILLEM SCHIMMEL.